(12) United States Patent
Herrero Verón

(10) Patent No.: US 7,873,357 B2
(45) Date of Patent: Jan. 18, 2011

(54) SELECTIVE DISABLEMENT OF MOBILE COMMUNICATION EQUIPMENT CAPABILITIES

(75) Inventor: Christian Herrero Verón, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1133 days.

(21) Appl. No.: 11/258,664

(22) Filed: Oct. 26, 2005

(65) Prior Publication Data

US 2006/0094415 A1 May 4, 2006

Related U.S. Application Data

(60) Provisional application No. 60/625,087, filed on Nov. 4, 2004.

(51) Int. Cl.
*H04M 3/00* (2006.01)
(52) U.S. Cl. .................. 455/419; 455/418; 455/420
(58) Field of Classification Search .................. 455/419, 455/418
See application file for complete search history.

(56) References Cited

U.S. PATENT DOCUMENTS

| | | | |
|---|---|---|---|
| 5,794,142 A | 8/1998 | Vanttila et al. | |
| 6,223,032 B1 | 4/2001 | Cuffaro | |
| 2003/0065934 A1 | 4/2003 | Angelo | |
| 2004/0047339 A1 | 3/2004 | Wang et al. | |
| 2004/0203941 A1 | 10/2004 | Kaplan et al. | |
| 2008/0043726 A1 | 2/2008 | Herrero-Veron | |

FOREIGN PATENT DOCUMENTS

| | | | |
|---|---|---|---|
| EP | 1 333 696 A | | 8/2003 |
| GB | 2 380 356 A | | 4/2003 |
| JP | 02004118275 A | * | 4/2004 |
| JP | 02004186817 A | * | 7/2004 |
| WO | 2005/081570 A | | 9/2005 |

OTHER PUBLICATIONS

PCT International Search Report, mailed Sep. 7, 2007, in connection with International Application No. PCT/EP2007/054433 (counterpart of co-pending U.S. Appl. No. 11/745,165 which was published as US20080043726 and cited above.).

(Continued)

*Primary Examiner*—David Q Nguyen
(74) *Attorney, Agent, or Firm*—Potomac Patent Group PLLC

(57) ABSTRACT

Network services and/or network capabilities in a mobile terminal operating in a mobile communications system are selectively enabled. This involves receiving an information element encoded to indicate whether each of a number of network services and/or network capabilities is enabled or disabled. The information element is then stored in the mobile terminal. The mobile terminal is then operated in a way that inhibits the mobile terminal from requesting all network services and network capabilities that are indicated by the information element as being disabled. The information element may optionally include a text string and/or a customer service number to be displayed to a user of the mobile terminal for the purpose of assisting the user in determining the cause of the non-availability of one or more services and/or capabilities.

32 Claims, 2 Drawing Sheets

OTHER PUBLICATIONS

PCT Written Opinion mailed Sep. 7, 2007, in connection with International Application No. PCT/EP2007/054433 (counterpart of co-pending U.S. Appl. No. 11/745,165 which was published as US20080043726 and cited above.).

3GPP Technical Report TR 23.805 V0.3.1, Selective Disabling of UE Capabilities; Report on Technical Options and Conclusions (Release 7), Sep. 2005.

3GPP Technical Specification TS 24.305 V0.1.0, Selective Disabling of 3GPP UE Capabilities (SDoUE) Management Object (MO) (Release 7), Mar. 2006.

Open Mobile Alliance (OMA) Device Management Requirements, Candidate Version 1.2, Apr. 24, 2006. OMA-RD-DM-V1_2-20060424-C.

Open Mobile Alliance (OMA) Enabler Release Definition for OMA Device Management, Candidate Version 1.2, Mar. 9, 2006. OMA-ERELD-DM-V1_2-20060309-C.

Open Mobile Alliance (OMA) Device Management Protocol, Candidate Version 1.2, Apr. 24, 2006. OMA-TS-DM-Protocol-V1_2-20060424-C.

Open Mobile Alliance (OMA) Device Management Standardized Objects, Candidate Version 1.2, Apr. 24, 2006. OMA-TS-DM-StdObj-V1_2-20060424-C.

Hameleers, H. et al., "IP Technology in WCDMA/GSM Core Networks", Ericsson Review No. 1, pp. 14-27, 2002.

Third Generation Partnership Project (3GPP) TS 24.008 V6.0.0 (Mar. 2003), Sections 4.3.6 4.7.12, 9.2.3, 9.2.15a, 9.4.2, 9.4.3, 9.4.15, 9.4.16 and 9.4.19.

Third Generation Partnership Project (3GPP) TS 22.011 V7.1.0 (Mar. 2005).

PCT International Search Report, dated Jan. 25, 2006, in connection with International Application No. PCT/EP2005/011809.

PCT Written Opinion, dated Jan. 25, 2006, in connection with International Application No. PCT/EP2005/011809.

* cited by examiner

| 8 | 7 | 6 | 5 | 4 | 3 | 2 | 1 | |
|---|---|---|---|---|---|---|---|---|
| colspan="8" | List of Selective UE Capabilities IEI | octet 1 |
| colspan="8" | Length of Selective UE Capabilities contents | octet 2 |
| GPRS SM | LCS via PS | LCS via CS | SMS via PS | SMS via CS | SS | EC | CC | octet 3 |
| colspan="6" | spare | IMS | MBMS SM | octet 4 |
| 0 | 0 | 0 | 0 | 0 | 0 | | | |
| colspan="8" | Length of 1st Customer Care Service Number | octet 5* |
| ext 1 | colspan="3" | Type of number | colspan="4" | Numbering plan identification | note 1) octet 6* |
| colspan="4" | Number digit 2 | colspan="4" | Number digit 1 | note 2) octet 7* |
| colspan="4" | Number digit 4 | colspan="4" | Number digit 3 | octet 8* |
| colspan="4" | : | colspan="4" | : | : |
| colspan="4" | note 3) | colspan="4" | | octet h-1* |
| colspan="8" | Length of 2nd Customer Care Service Number | octet h* |
| ext 1 | colspan="3" | Type of number | colspan="4" | Numbering plan identification | note 1) octet h+1 |
| colspan="4" | Number digit 2 | colspan="4" | Number digit 1 | note 2) octet h+2* |
| colspan="4" | Number digit 4 | colspan="4" | Number digit 3 | octet h+3* |
| colspan="4" | : | colspan="4" | : | : |
| colspan="4" | note 3) | colspan="4" | : | octet h+n* |
| colspan="8" | Length of Network Text String contents | octet i* |
| ext 1 | colspan="3" | Coding scheme | spare 0 | colspan="3" | Number of spare bits in last octet | note 4) octet i+1* |
| colspan="8" | Text String | note 4) octet i+2* : octet m* |

FIG. 2

SELECTIVE DISABLEMENT OF MOBILE COMMUNICATION EQUIPMENT CAPABILITIES

CROSS REFERENCE TO RELATED APPLICATIONS

This application claims the benefit of U.S. Provisional Application No. 60/625,087, filed Nov. 4, 2004, which is hereby incorporated herein by reference in its entirety.

BACKGROUND

The present invention relates to mobile communication systems, and more particularly to techniques for selectively disabling one or more functions/capabilities in mobile user equipment.

Mobile communication systems, such as cellular communication systems, allow mobile user equipment (UE) to communicate wirelessly by establishing a wireless (e.g., radio) link between the UE and one of a number of base stations (BS) which are geographically distributed throughout a service area. Mobility is provided by means of protocols that enable the UE to be handed off from a first BS to another as it moves from the coverage area of the first BS to the coverage area of the other BS.

The various base stations are connected (e.g., by means of wireless and/or wired links) to a public land mobile network (PLMN), which provides the necessary infrastructure for servicing calls. The PLMN also typically has connections to public switched telephone networks (PSTNs) to enable calls to be routed to wireline communication devices not associated with the PLMN.

In order to enable interoperability between equipment designed and made by different manufacturers, a number of mobile communications standards have been adhered to in the past and present, and new ones, such as standards developed and promulgated by the $3^{rd}$ Generation Partnership Project (3GPP), continue to evolve. The 3GPP is a collaboration agreement made between a number of telecommunications standards bodies. The 3GPP is responsible for maintenance and development of the Global System for Mobile communication (GSM) Technical Specifications and Technical Reports including evolved radio access technologies such as General Packet Radio Service (GPRS) and Enhanced Data rates for GSM Evolution (EDGE). The 3GPP is also producing globally applicable Technical Specifications and Technical Reports for a $3^{rd}$ Generation Mobile System based on evolved GSM core networks and the radio access technologies that they support (e.g., Universal Terrestrial Radio Access (UTRA) both Frequency Division duplex (FDD) and Time Division Duplex (TDD) modes).

Although 3GPP terminology is used herein to provide a well-known point of reference to the reader, it will be understood that the various principals and aspects described here are not limited to systems designed in accordance with 3GPP specifications, but rather are applicable in any similar type of mobile communications system.

A problem that can be encountered in a mobile communications system is that of misbehaving User Equipment (UE). A misbehaving UE is one that contains a malicious or malformed application that may act to repeatedly request services from and/or connections to the network. This type of activity by the UE degrades the system because of both allocation of radio resources and wasting of network signaling processing. The misbehaving application may be downloaded to the UE by the user through various means, for example e-mail, SMS and Push services, and (exceptionally) fail to be detected and disabled by application layer preventative measures.

It is foreseen that the near future will bring an increase in the number of applications downloaded to the terminals. This will certainly increase the possibility of malicious or malformed applications being downloaded and installed onto a user's UE, thereby making the UE a misbehaving one.

Selective Disabling of UE Capabilities (SDoUE) is a feature approved by 3GPP which allows operators to selectively disable services on 'misbehaving' UEs when necessary. Other communications standards may approve a comparable feature.

To date, there is no mechanism specified for selectively disabling UE capabilities.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in techniques for selectively enabling network services and/or network capabilities in a mobile terminal operating in a mobile communications system. In one aspect, this involves receiving an information element encoded to indicate whether each of a number of network services and/or network capabilities is enabled or disabled. The information element is then stored in the mobile terminal. The mobile terminal is then operated in a way that inhibits the mobile terminal from requesting all network services and network capabilities that are indicated by the information element as being disabled.

In some embodiments, information about the availability of network services and/or network capabilities is output to a user of the mobile terminal, wherein the information is derived from the received information element.

In some embodiments, the information element includes a text string that is displayed to a user of the mobile terminal.

In some embodiments, the information element includes a customer service telephone number that is displayed to a user of the mobile terminal.

In another aspect, after the mobile terminal has disabled requesting a first network service or capability based upon the information element, the first network service or capability is re-enabled in response to receiving a subsequent information element encoded to indicate that the first network service or capability is enabled.

In another aspect, the information element is stored in a memory that retains the information element regardless of whether the mobile terminal is switched on or off.

In yet another aspect, the information element is stored in a memory that is not within a Subscriber Identity Module (SIM) or Universal Subscriber Identity Module (USIM) of the mobile terminal.

In still another aspect, the mobile terminal receives, from a public land mobile network, an information element encoded to request a status report indicating whether each of a number of network services and/or network capabilities is enabled or disabled. In response to receiving the information element encoded to request the status report, the mobile terminal sends to the public land mobile network the information element encoded to indicate whether each of the number of network services and/or network capabilities is enabled or disabled.

In yet another aspect, receiving, from the public land mobile network, the information element encoded to request the status report, is performed as part of a registration procedure between the mobile terminal and the public land mobile network.

BRIEF DESCRIPTION OF THE DRAWINGS

The objects and advantages of the invention will be understood by reading the following detailed description in conjunction with the drawings in which:

FIG. 2 illustrates an exemplary embodiment of a Selective UE Capabilities List Information Element.

DETAILED DESCRIPTION

Figure 1:
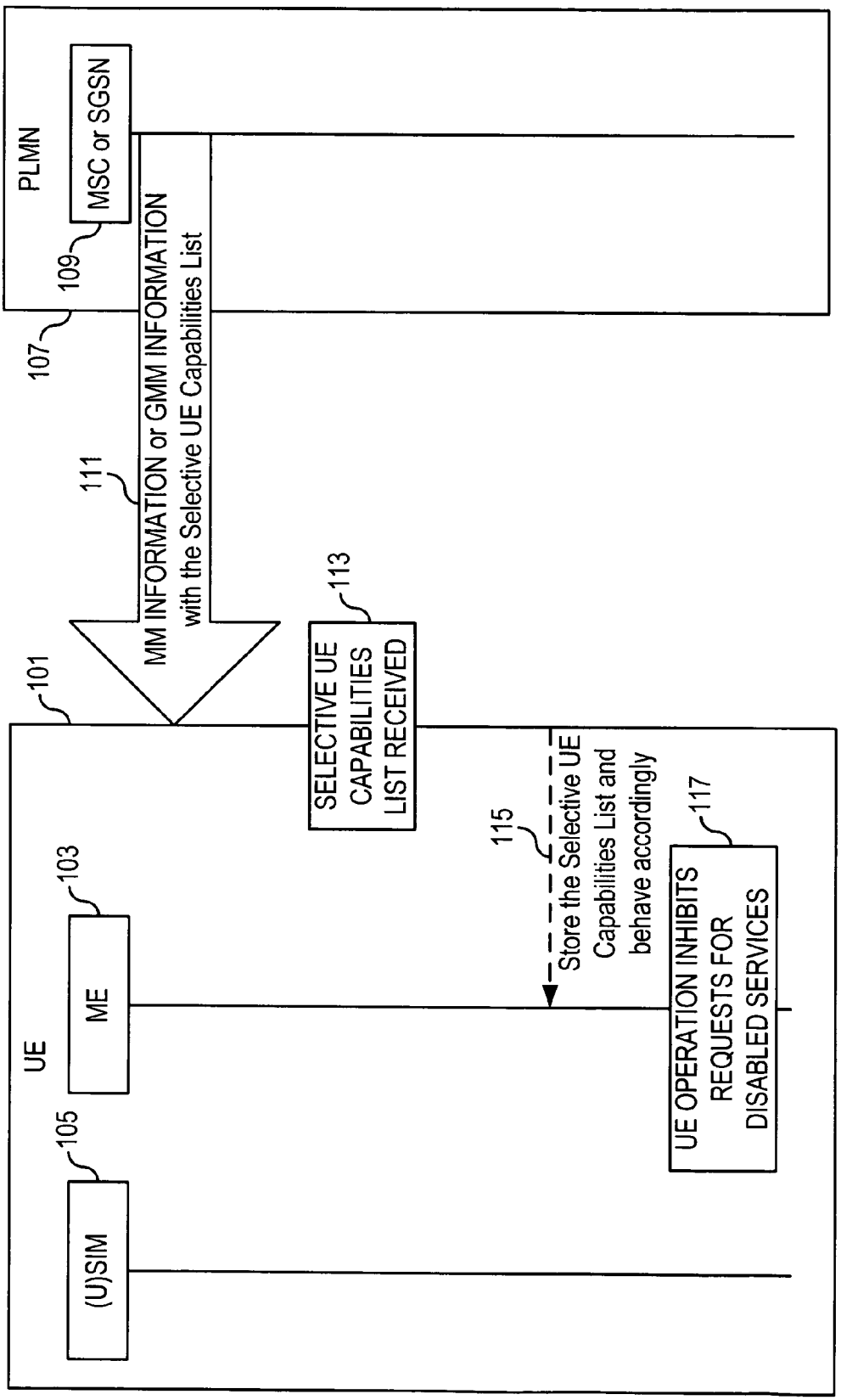
FIG. 1 is a messaging diagram that illustrates an exemplary process carried out between a UE and a Public Land Mobile Network in which the UE is currently roaming.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

An aspect of the invention is a new mechanism for selectively disabling UE capabilities by sending and storing a list of Selective UE Capabilities in the UE to indicate the availability of one or more services in the PLMN code of the network on which the list was received and any other network. In operation, the UE refers to the list prior to requesting any service, and does not request services that have not been indicated as enabled.

To facilitate an understanding of the various aspects of the invention and to provide familiar terminology to the reader, embodiments consistent with 3GPP specifications are described. However, it will be understood that the various principals and aspects described here are not limited to systems designed in accordance with 3GPP specifications, but rather are applicable in any similar type of mobile communications system.

The various embodiments utilize communications between the network and the UE to carry the indication of the availability/non-availability of the services. In 3GPP systems, it is advantageous to re-use the already existing Mobility Management (MM) and GPRS Mobility Management (GMM) functionality for this purpose. This is achieved by enhancing the MM INFORMATION and GMM INFORMATION message defined by 3GPP TS 24.008.

FIG. 1 is a messaging/process diagram that illustrates an exemplary process carried out between a UE 101 and a Public Land Mobile Network (PLMN) 103 in which the UE 101 is currently roaming. The UE 101 includes Mobile Equipment (ME) 103 and either a Universal Subscriber Identity Module (USIM) or a Subscriber Identity Module (SIM) 105 (generically referred to herein as a "(U)SIM"). The PLMN 107 may include a Mobile service Switching Center (MSC) and/or Serving GPRS Support Node 109. The PLMN 107 uses the MM INFORMATION and GMM INFORMATION message to download (step 111) an Information Element (IE) called the "Selective User Equipment (UE) Capabilities List" to the UE 101. The Selective UE Capabilities List indicates to the UE 101 the availability of one or more services in the PLMN code of the PLMN 107 on which the list was received and any other network (i.e., the list prevents the UE 101 from requesting disabled services from all networks the UE 101 may roam onto).

Having received the Selective UE Capabilities List (step 113), the UE stores it in the ME 103 (step 115) within a storage area that will retain the Selective UE Capabilities List even when the UE 101 is switched off. In this way, the UE 101 will maintain the status of the availability of specific UE capabilities (i.e., whether enabled or disabled) when the UE 101 is switched back on. The UE 101 is not allowed to request services that have not been indicated as enabled (STEP 117).

The Selective UE Capabilities List IE may also contain one or more customer care service numbers and a text string that assist the end user in determining the cause of non-availability of specific services. The text string might, for example, state "Your mobile is infected with a virus. Call your operator" or "Call your operator on the following number." If the optional customer care service number(s) or text string is received in the new IE, the UE 101 preferably informs the user immediately about the customer care service number(s) and displays the text string.

Additionally, the UE 101 should use the indications given in the Selective UE Capabilities list to inform the user about the availability of the appropriate services, (e.g., "Short Message Service (SMS) via the Packet Switched (PS) network is not allowed").

In some embodiments, the disabling mechanism can be made secure by applying ciphering on the MM INFORMATION and GMM INFORMATION messages any time the new Selective UE Capabilities list IE is included. When this feature is included in an embodiment, the ciphering of these messages should be mandatory whenever the Selective UE Capabilities List IE is included.

An advantage achieved by storing the Selective UE Capabilities List within the ME 103 is that it makes it possible to prohibit the making of requests for disabled services in the UE 101 even when no (U)SIM 105 is present. It will be recalled that a UE is normally permitted to access the network for emergency calls, even when no (U)SIM is installed, so storing the Selective UE Capabilities List within the ME 103 protects the network from a misbehaving UE even under these circumstances.

In another aspect, the Selective UE Capabilities List is used to achieve a repair functionality, wherein a service or capability that had been disabled is re-enabled when the network deems this to be appropriate. For example, the user may download a misbehaving (or infected) Java application to the terminal, which makes it not function correctly. As a result, one or more services or capabilities are disabled, as described earlier. However, proper functionality may later be restored (e.g., the user may call an operator's support center, which results in a correct patch being downloaded by the user or automatically downloaded by the operator). Consequently, it is appropriate for the network to provide the UE 101 with a new Selective UE Capabilities List that re-enables the previously disabled service(s) and/or capability(-ies).

Another use of the Selective UE Capabilities List is to inform a Home PLMN (HPLMN) or Visited PLMN (VPLMN) of the status of the Selective UE Capabilities List stored (available) in the UE 101. This can be implemented, for example, by including a Request MS information IE in any of the ROUTING AREA UPDATE ACCEPT, ATTACH ACCEPT or LOCATION UPDATING ACCEPT messages. In systems that are consistent with the 3GPP standard, the Request MS information IE should be enhanced with the addition of a new bit for signaling to the UE 101 a request for the Selective UE Capabilities List IE to be sent to the PLMN 107. In addition, the Selective UE Capabilities List IE should be allowed to be included in the ATTACH COMPLETE, ROUTING AREA UPDATE COMPLETE messages. For the location updating procedure, one solution is to enhance the LOCATION UPDATING ACCEPT message in a similar way as described with respect to the ATTACH ACCEPT and ROUTING AREA UPDATE messages. In particular, a new field (e.g., one designated bit position) can be added to the Request MS Information IE for signaling to the UE that the new Selective UE Capabilities List IE should be included. Currently, the LOCATION UPDATING ACCEPT message does not provide for the possibility of including the Request MS information IE and its corresponding logic. Consequently, it should be allowed to include the Request MS Information IE in any LOCATION UPDATING ACCEPT message. Additionally, a new LOCATION UPDATING COMPLETE message should be added in which the Selective UE Capabilities IE could be included.

An exemplary embodiment of a Selective LE Capabilities List IE 200 will now be described with reference to FIG. 2. The exemplary embodiment is particularly useful for systems operating in accordance with 3GPP standards. It will be understood that the particular layout and encoding of fields in the Selective UE Capabilities List IE 200 is merely exemplary, and that many other layouts and field definitions are possible and useable in alternative embodiments.

As shown in FIG. 2, the exemplary Selective UE Capabilities List IE 200 comprises a number, m, of octets. Each octet has bits, numbered 1 through 8, with bit number 8 being most significant and bit number 1 being least significant. Octet 1 is encoded with a value that identifies this information element as a Selective UE Capabilities List IE.

As will be seen shortly, the Selective UE Capabilities List IE 200 includes a number of fields of variable length. Consequently, the total length of the Selective UE Capabilities List IE 200 is itself variable. Octet 2 is therefore encoded to indicate this total length.

Octets 3 and 4 are encoded to indicate whether each of a number of network services and/or network capabilities is enabled or disabled. In this exemplary embodiment, this is achieved by associating each of the selectively enabled network services/capabilities with a respective one of the bits in octets 3 and 4. When the bit is set to one state (e.g., 0), the corresponding service/capability is enabled; when set to the other state (e.g., 1) the corresponding service/capability is disabled. An exemplary encoding of octet 3 is shown in Table 1. An exemplary encoding of octet 4 is shown in Table 2.

TABLE 1

Exemplary encoding of octet 3 of Selective UE Capabilities Information Element

| Bit Number | Field Name | Bit Value | Meaning |
|---|---|---|---|
| 1 | CC | 0 | Call Control procedures enabled |
|   |    | 1 | Call Control procedures disabled |
| 2 | EC | 0 | Call Control procedures for emergency calls enabled |
|   |    | 1 | Call Control procedures for emergency calls disabled |
| 3 | SS | 0 | Supplementary Services procedures enabled |
|   |    | 1 | Supplementary Services procedures disabled |
| 4 | SMS via CS | 0 | Short Message Service via the CS domain enabled |
|   |            | 1 | Short Message Service via the CS domain disabled |
| 5 | SMS via PS | 0 | Short Message Service via the PS domain enabled |
|   |            | 1 | Short Message Service via the PS domain disabled |
| 6 | LCS via CS | 0 | Location Services via the CS domain enabled |
|   |            | 1 | Location Services via the CS domain disabled |
| 7 | LCS via PS | 0 | Location Services via the PS domain enabled |
|   |            | 1 | Location Services via the PS domain disabled |
| 8 | GPRS SM | 0 | GPRS Session Management procedures enabled |
|   |         | 1 | GPRS Session management procedures disabled |

TABLE 2

Exemplary encoding of octet 4 of Selective UE Capabilities Information Element

| Bit Number | Field Name | Bit Value | Meaning |
|---|---|---|---|
| 1 | MBMS SM | 0 | MBMS Session Management procedures enabled |
|   |         | 1 | MBMS Session Management procedures disabled |
| 2 | IMS | 0 | IP Multimedia Subsystem procedures enabled |
|   |     | 1 | IP Multimedia Subsystem procedures disabled |
| 3 | (spare) | 0 | Should be set to '0' |
|   |         | 1 | N/A |
| 4 | (spare) | 0 | Should be set to '0' |
|   |         | 1 | N/A |
| 5 | (spare) | 0 | Should be set to '0' |
|   |         | 1 | N/A |
| 6 | (spare) | 0 | Should be set to '0' |
|   |         | 1 | N/A |
| 7 | (spare) | 0 | Should be set to '0' |
|   |         | 1 | N/A |
| 8 | (spare) | 0 | Should be set to '0' |
|   |         | 1 | N/A |

In an aspect of the invention, the LE is operated in a way that inhibits the UE from requesting all network services and network capabilities that are indicated by the information element as being disabled. For the exemplary Selective UE Capabilities IE 200, the LE is operated as follows:

If the Selective UE Capabilities List IE is received, then the UE preferably takes the following actions:

If the CC bit is set to 1, the UE initiates the release of all active calls and enters the state U0 "null". Furthermore, the UE shall not use call control procedures except for emergency calls and the customer care service number(s), if received, from now on until a new Selective UE Capabilities List IE with the CC bit set to 0 is received.

If the EC bit is set to 1, the UE automatically initiates the release of all active emergency calls, if any. Furthermore, the UE shall not use call control procedures for emergency calls from now on until a new Selective UE Capabilities List IE with the EC bit set to 0 is received.

If the SS bit is set to 1, the UE shall terminate all active supplementary service operations. Furthermore, the UE shall not invoke supplementary service operations and their responses (e.g., for location services (LCS)) from now on until a new Selective UE Capabilities List IE with the SS bit set to 0 is received;

If the SMS via CS bit is set to 1, the UE shall not use the circuit-switched domain for SMS transfer from now on until a new Selective UE Capabilities List IE with the SMS bit set to 0 is received. As an implementation option (i.e., alternative embodiment), the UE may use GPRS instead of the circuit-switched domain for SMS transfer.

If the SMS via PS bit is set to 1, the UE shall not use GPRS for SMS transfer from now on until a new Selective UE Capabilities List IE with the SMS via PS bit set to 0 is received. As an implementation option (i.e., alternative embodiment), the UE may use the circuit-switched domain instead of GPRS for SMS transfers.

If the LCS via CS bit is set to 1, the UE shall not use the circuit-switched domain for location services from now on until a new Selective LE Capabilities List IE with the LCS bit set to 0 is received. As an implementation option (i.e., alternative embodiment), the UE may use GPRS instead of the circuit-switched domain for location services.

If the LCS via PS bit is set to 1, the UE shall not use GPRS for location services from now on until a new Selective UE Capabilities List IE with the LCS bit set to 0 is received. As an implementation option (i.e., alternative embodiment), the UE may use the circuit-switched domain instead of GPRS for location services.

If the GPRS SM bit is set to 1, the UE releases all resources allocated for active PDP contexts and erases the PDP context data. Furthermore, the UE enters the STANDBY state if in A/Gb mode, or the PMM-IDLE state if in Iu mode. Additionally, the UE shall not use GPRS SM procedures from now on until a new Selective UE Capabilities List IE with the GPRS SM bit set to 0 is received.

If the MBMS SM bit is set to 1, the UE releases all resources allocated for active MBMS contexts and erases the MBMS context data. Furthermore, the UE shall not use MBMS SM procedures from now on until a new Selective UE Capabilities List IE with the MBMS SM bit set to 0 is received.

If the IMS bit is set to 1, the UE releases all resources allocated for IP Multimedia Subsystem (IMS) sessions. Furthermore, the UE shall not use IMS procedures for IMS services from now on until a new Selective UE Capabilities List IE with the IMS bit set to 0 is received.

Returning now to a discussion of the exemplary Selective UE Capabilities List IE 200 illustrated in FIG. 2, octets 5 through h−1 convey a first Customer Care Service Number, and octets h through h+n convey a second Customer Care Service Number. Octets 5 and h are encoded to indicate the lengths of the respective first and second Customer Care Service Numbers. Octets 6 and h+1 each have fields indicating the Numbering Plan Identification and Type of Number of a respective one of the first and second Customer Care Service Numbers. The Type of Number field can, for example, be encoded as illustrated in Table 3.

TABLE 3

Exemplary encoding of Type of Number field

| Bits | | | Meaning |
|---|---|---|---|
| 7 | 6 | 5 | |
| 0 | 0 | 0 | Unknown |
| 0 | 0 | 1 | International number |
| 0 | 1 | 0 | National number |
| 0 | 1 | 1 | Network specific number |
| 1 | 0 | 0 | Dedicated access, short code |
| 1 | 0 | 1 | Reserved |
| 1 | 1 | 0 | Reserved |
| 1 | 1 | 1 | Reserved |

Referring to Table 3, the type of number designated as "unknown" is used when the user or the network has no knowledge of the type of number (e.g., international number, national number, etc.). In this case the number digits field is organized according to the network dialing plan (e.g., prefix or escape digits might be present).

If either a National Number or an International Number is indicated, then prefix or escape digits will not be included.

Also, if an International Number is indicated, then the international format shall be accepted by the MSC when the call is destined to a destination in the same country as the MSC.

Still referring to Table 3, the type of number designated as "Network Specific Number" is used to indicate an administration/service number specific to the serving network (e.g., used to access an operator).

The Numbering Plan Identification field can, for example, be encoded as illustrated in Table 4.

TABLE 4

Exemplary encoding of Numbering plan identification field

| Bits | | | | Meaning |
|---|---|---|---|---|
| 4 | 3 | 2 | 1 | |
| 0 | 0 | 0 | 0 | Unknown |
| 0 | 0 | 0 | 1 | ISDN/telephony numbering plan |
| 0 | 0 | 1 | 1 | Data numbering plan |
| 0 | 1 | 0 | 0 | Telex numbering plan |
| 1 | 0 | 0 | 0 | National numbering plan |
| 1 | 0 | 0 | 1 | Private numbering plan |
| 1 | 0 | 1 | 1 | Reserved for CTS |
| 1 | 1 | 1 | 1 | Reserved for extension |

The encoding of the Numbering Plan field is valid when the type of number is either '000', '001', '010', or '100'.

Referring back to FIG. 2, each number digit (e.g., Number digit 1, Number digit 2, Number digit 3, . . . ) can be encoded as illustrated in Table 5.

TABLE 5

Exemplary encoding of Number Digit field

| Bits | | | | Number digit value |
|---|---|---|---|---|
| 4 | 3 | 2 | 1 | |
| Or | | | | |
| 8 | 7 | 6 | 5 | |
| 0 | 0 | 0 | 0 | 0 |
| 0 | 0 | 0 | 1 | 1 |
| 0 | 0 | 1 | 0 | 2 |

TABLE 5-continued

Exemplary encoding of Number Digit field

| Bits | | | | |
|---|---|---|---|---|
| 4 | 3 | 2 | 1 | |
| Or | | | | |
| 8 | 7 | 6 | 5 | Number digit value |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | * |
| 1 | 0 | 1 | 1 | # |
| 1 | 1 | 0 | 0 | a |
| 1 | 1 | 0 | 1 | b |
| 1 | 1 | 1 | 0 | c |
| 1 | 1 | 1 | 1 | Used as an endmark in the case of an odd number of number digits in the Customer Care Service Number |

The last part of the exemplary Selective UE Capabilities List IE 200 illustrated in FIG. 2 is the optional text string, referred to earlier. In this regard, octet i (i=h+n+1) is encoded to indicate the length of the Network Text String contents. The next octet (octet i+1) includes a field indicating the Coding Scheme, and another field indicating the Number of Spare Bits in the Last Octet. The field indicating the Number of Spare Bits in the Last Octet may, for example, be encoded as shown in Table 6.

TABLE 6

Exemplary encoding of Number of Spare Bits in Last Octet field

| Bits | | | |
|---|---|---|---|
| 3 | 2 | 1 | Number digit value |
| 0 | 0 | 1 | Bit 8 is spare and set to "0" in octet n |
| 0 | 1 | 0 | Bits 7 and 8 are spare and set to "0" in octet n |
| 0 | 1 | 1 | Bits 6 to 8 (inclusive) are spare and set to "0" in octet n |
| 1 | 0 | 0 | Bits 5 to 8 (inclusive) are spare and set to "0" in octet n |
| 1 | 0 | 1 | Bits 4 to 8 (inclusive) are spare and set to "0" in octet n |
| 1 | 1 | 0 | Bits 3 to 8 (inclusive) are spare and set to "0" in octet n |
| 1 | 1 | 1 | Bits 2 to 8 (inclusive) are spare and set to "0" in octet n |
| 0 | 0 | 0 | This field carries no information about the number of spare bits in octet n |

The Coding Scheme field in octet i+1 may be encoded as illustrated in Table 7.

TABLE 7

Exemplary encoding of Coding Scheme field

| Bits | | | |
|---|---|---|---|
| 7 | 6 | 5 | Number digit value |
| 0 | 0 | 0 | Cell Broadcast data coding scheme, GSM default alphabet, language unspecified, defined in 3GPP TS 23.038 |
| 0 | 0 | 1 | UCS2 (16 bit) |
| 0 | 1 | 0 | Reserved |
| 0 | 1 | 1 | Reserved |
| 1 | 0 | 0 | Reserved |

TABLE 7-continued

Exemplary encoding of Coding Scheme field

| Bits | | | |
|---|---|---|---|
| 7 | 6 | 5 | Number digit value |
| 1 | 0 | 1 | Reserved |
| 1 | 1 | 0 | Reserved |
| 1 | 1 | 1 | Reserved |

The various aspects of the invention described herein provide a number of advantages, some of which are:

A solution is provided for all the selective disabling of UE capabilities requirements defined by standards such as 3GPP.

Implementations in the UE affect only the ME, not the (U)SIM.

The various embodiments described herein are inexpensive and quick to implement in UEs.

Misbehaving UEs not having a (U)SIM can be prevented from allocating and wasting network and radio resources (i.e., the Universal Integrated Circuit Card (UICC)-less scenario).

Home network providers (e.g., HPLMNs) as well as Visited network operators are provided with a mechanism for controlling all users in their networks.

Because the various embodiments do not involve storing the Selective UE Capabilities list in the (U)SIM, the user of a misbehaving UE is able to move the (U)SIM (and therefore the subscription) to a different, non-misbehaving, non-malformed UE, and thereby continue to receive service.

User interaction can be included (e.g., the customer care service number, a message to the user).

The invention has been described with reference to particular embodiments. However, it will be readily apparent to those skilled in the art that it is possible to embody the invention in specific forms other than those of the embodiment described above.

For example, preferred embodiments described above all include storing the Selective UE Capabilities List IE in the ME, not in the (U)SIM, this is not a requirement for achieving the basic ability to selectively enable/disable network services/capabilities. While it is advantageous, for reasons explained above, to avoid storing the Selective UE Capabilities List IE in the (U)SIM, such embodiments could be useful.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of selectively enabling network services and/or network capabilities in a mobile terminal operating in a mobile communications system, the method comprising:
receiving an information element encoded to indicate whether each of a number of network services and/or network capabilities is enabled or disabled;
storing the information element in the mobile terminal; and
prior to each request for a network service, referring to the information element and inhibiting the mobile terminal from requesting the network service if the information element indicates that the network service is disabled, and enabling the mobile terminal to request the network service if the information element indicates that the network service is enabled,
wherein the information element includes a plurality of 1-bit fields, each corresponding to a different one of a plurality of network services and/or network capabilities, wherein each of the 1-bit fields is encoded such that setting the 1-bit field to one state indicates that the corresponding network service and/or network capability is enabled, and setting the 1-bit field to a different state indicates that the corresponding network service and/or network capability is disabled.

2. The method of claim 1, comprising:
outputting to a user of the mobile terminal information about the availability of network services and/or network capabilities, wherein the information is derived from the received information element.

3. The method of claim 1, wherein:
the information element includes a text string; and
the method includes displaying the text string to a user of the mobile terminal.

4. The method of claim 1, wherein:
the information element includes a customer service telephone number; and
the method includes displaying the customer service telephone number to a user of the mobile terminal.

5. The method of claim 1, wherein:
the information element indicates that a first network service or first network capability is disabled; and
the method comprises:
  receiving a subsequent information element encoded to indicate that the first network service or first network capability is enabled;
  storing the subsequent information element in the mobile terminal; and
  operating the mobile terminal in a way that re-enables the mobile terminal's ability to request the first network service or first network capability.

6. The method of claim 1, wherein storing the information element in the mobile terminal comprises storing the information element in a memory that retains the information element regardless of whether the mobile terminal is switched on or off.

7. The method of claim 1, wherein storing the information element in the mobile terminal comprises storing the information element in a memory that is not within a Subscriber Identity Module (SIM) or a Universal Subscriber Identity Module (USIM) of the mobile terminal.

8. The method of claim 1, comprising:
receiving, from a public land mobile network, an information element encoded to request a status report indicating whether each of a number of network services and/or network capabilities is enabled or disabled; and
in response to receiving the information element encoded to request the status report, sending to the public land mobile network the information element encoded to indicate whether each of the number of network services and/or network capabilities is enabled or disabled.

9. The method of claim 8, wherein:
receiving, from the public land mobile network, the information element encoded to request the status report, is performed as part of a registration procedure between the mobile terminal and the public land mobile network.

10. The method of claim 8, wherein:
the mobile communications system operates in accordance with a Third Generation Partnership Project (3GPP) standard that defines a ROUTING AREA UPDATE ACCEPT message; and
receiving, from the public land mobile network, the information element encoded to request the status report indicating whether each of a number of network services and/or network capabilities is enabled or disabled comprises receiving a ROUTING AREA UPDATE ACCEPT message that is encoded to request the status report indicating whether each of a number of network services and/or network capabilities is enabled or disabled.

11. The method of claim 8, wherein:
the mobile communications system operates in accordance with a Third Generation Partnership Project (3GPP) standard that defines an ATTACH ACCEPT message; and
receiving, from the public land mobile network, the information element encoded to request the status report indicating whether each of a number of network services and/or network capabilities is enabled or disabled comprises receiving an ATTACH ACCEPT message that is encoded to request the status report indicating whether each of a number of network services and/or network capabilities is enabled or disabled.

12. The method of claim 8, wherein:
the mobile communications system operates in accordance with a Third Generation Partnership Project (3GPP) standard that defines a LOCATION UPDATING ACCEPT message; and
receiving, from the public land mobile network, the information element encoded to request the status report indicating whether each of a number of network services and/or network capabilities is enabled or disabled comprises receiving a LOCATION UPDATING ACCEPT message that is encoded to request the status report indicating whether each of a number of network services and/or network capabilities is enabled or disabled.

13. The method of claim 12, wherein sending to the public land mobile network the information element encoded to indicate whether each of the number of network services and/or network capabilities is enabled or disabled comprises:
sending to the public land mobile network a LOCATION UPDATING COMPLETE message that comprises the information element encoded to indicate whether each of the number of network services and/or network capabilities is enabled or disabled.

14. The method of claim 1, wherein:
the mobile communications system operates in accordance with a Third Generation Partnership Project (3GPP) standard that defines an MM INFORMATION message; and
receiving the information element encoded to indicate whether each of the number of network services and/or network capabilities is enabled or disabled comprises receiving an MM INFORMATION message that includes the information element encoded to indicate whether each of the number of network services and/or network capabilities is enabled or disabled.

15. The method of claim 1, wherein:
the mobile communications system operates in accordance with a Third Generation Partnership Project (3GPP) standard that defines a GMM INFORMATION message; and receiving the information element encoded to indicate whether each of the number of network services and/or network capabilities is enabled or disabled comprises receiving a GMM INFORMATION message that includes the information element encoded to indicate whether each of the number of network services and/or network capabilities is enabled or disabled.

16. The method of claim 1, wherein the one state that indicates that the corresponding network service and/or network capability is enabled is equal to a "0", and the different state that indicates that the corresponding network service and/or network capability is disabled is equal to a "1".

17. An apparatus that selectively enables network services and/or network capabilities in a mobile terminal operating in a mobile communications system, the apparatus comprising:
logic that receives an information element encoded to indicate whether each of a number of network services and/or network capabilities is enabled or disabled;
logic that stores the information element in the mobile terminal; and
logic that, prior to each request for a network service, refers to the information element and inhibits the mobile terminal from requesting the network service if the information element indicates that the network service is disabled, and enables the mobile terminal to request the network service if the information element indicates that the network service is enabled,
wherein the information element includes a plurality of 1-bit fields, each corresponding to a different one of a plurality of network services and/or network capabilities, wherein each of the 1-bit fields is encoded such that setting the 1-bit field to one state indicates that the corresponding network service and/or network capability is enabled, and setting the 1-bit field to a different state indicates that the corresponding network service and/or network capability is disabled.

18. The apparatus of claim 17, comprising:
logic that outputs to a user of the mobile terminal information about the availability of network services and/or network capabilities, wherein the information is derived from the received information element.

19. The apparatus of claim 17, wherein:
the information element includes a text string; and
the apparatus includes logic that displays the text string to a user of the mobile terminal.

20. The apparatus of claim 17, wherein:
the information element includes a customer service telephone number; and
the apparatus includes logic that displays the customer service telephone number to a user of the mobile terminal.

21. The apparatus of claim 17, wherein:
the information element indicates that a first network service or first network capability is disabled; and
the apparatus comprises:
logic that receives a subsequent information element encoded to indicate that the first network service or first network capability is enabled;
logic that stores the subsequent information element in the mobile terminal; and
logic that operates the mobile terminal in a way that re-enables the mobile terminal's ability to request the first network service or first network capability.

22. The apparatus of claim 17, wherein the logic that stores the information element in the mobile terminal comprises logic that stores the information element in a memory that retains the information element regardless of whether the mobile terminal is switched on or off.

23. The apparatus of claim 17, wherein the logic that stores the information element in the mobile terminal comprises logic that stores the information element in a memory that is not within a Subscriber Identity Module (SIM) or a Universal Subscriber Identity Module (USIM) of the mobile terminal.

24. The apparatus of claim 17, comprising:
logic that receives, from a public land mobile network, an information element encoded to request a status report indicating whether each of a number of network services and/or network capabilities is enabled or disabled; and
logic that, in response to receiving the information element encoded to request the status report, sends to the public land mobile network the information element encoded to indicate whether each of the number of network services and/or network capabilities is enabled or disabled.

25. The apparatus of claim 24, wherein:
the logic that receives, from the public land mobile network, the information element encoded to request the status report, performs this function as part of a registration procedure between the mobile terminal and the public land mobile network.

26. The apparatus of claim 24, wherein:
the mobile communications system operates in accordance with a Third Generation Partnership Project (3GPP) standard that defines a ROUTING AREA UPDATE ACCEPT message; and
the logic that receives, from the public land mobile network, the information element encoded to request the status report indicating whether each of a number of network services and/or network capabilities is enabled or disabled comprises logic that receives a ROUTING AREA UPDATE ACCEPT message that is encoded to request the status report indicating whether each of a number of network services and/or network capabilities is enabled or disabled.

27. The apparatus of claim 24, wherein:
the mobile communications system operates in accordance with a Third Generation Partnership Project (3GPP) standard that defines an ATTACH ACCEPT message; and
the logic that receives, from the public land mobile network, the information element encoded to request the status report indicating whether each of a number of network services and/or network capabilities is enabled or disabled comprises logic that receives an ATTACH ACCEPT message that is encoded to request the status report indicating whether each of a number of network services and/or network capabilities is enabled or disabled.

28. The apparatus of claim 24, wherein:
the mobile communications system operates in accordance with a Third Generation Partnership Project (3GPP) standard that defines a LOCATION UPDATING ACCEPT message; and
the logic that receives, from the public land mobile network, the information element encoded to request the status report indicating whether each of a number of network services and/or network capabilities is enabled or disabled comprises logic that receives a LOCATION UPDATING ACCEPT message that is encoded to request the status report indicating whether each of a number of network services and/or network capabilities is enabled or disabled.

29. The apparatus of claim 28, wherein the logic that sends to the public land mobile network the information element encoded to indicate whether each of the number of network services and/or network capabilities is enabled or disabled comprises:

logic that sends to the public land mobile network a LOCATION UPDATING COMPLETE message that comprises the information element encoded to indicate whether each of the number of network services and/or network capabilities is enabled or disabled.

30. The apparatus of claim 17, wherein:

the mobile communications system operates in accordance with a Third Generation Partnership Project (3GPP) standard that defines an MM INFORMATION message; and the logic that receives the information element encoded to indicate whether each of the number of network services and/or network capabilities is enabled or disabled comprises logic that receives an MM INFORMATION message that includes the information element encoded to indicate whether each of the number of network services and/or network capabilities is enabled or disabled.

31. The apparatus of claim 17, wherein:

the mobile communications system operates in accordance with a Third Generation Partnership Project (3GPP) standard that defines a GMM INFORMATION message; and the logic that receives the information element encoded to indicate whether each of the number of network services and/or network capabilities is enabled or disabled comprises logic that receives a GMM INFORMATION message that includes the information element encoded to indicate whether each of the number of network services and/or network capabilities is enabled or disabled.

32. The method of claim 17, wherein the one state that indicates that the corresponding network service and/or network capability is enabled is equal to a "0", and the different state that indicates that the corresponding network service and/or network capability is disabled is equal to a "1".

* * * * *

UNITED STATES PATENT AND TRADEMARK OFFICE
CERTIFICATE OF CORRECTION

PATENT NO. : 7,873,357 B2  
APPLICATION NO. : 11/258664  
DATED : January 18, 2011  
INVENTOR(S) : Herrero Veron Page 1 of 1

It is certified that error appears in the above-identified patent and that said Letters Patent is hereby corrected as shown below:

On the Title Page 2, Item (56), under "OTHER PUBLICATIONS", Lines 8-9, delete "Disabiling" and insert -- Disabling --, therefor.

On the Title Page 2, Item (56), under "OTHER PUBLICATIONS", Line 10, delete "4.3.6" and insert -- 4.3.6, --, therefor.

In Column 1, Line 51, delete "duplex" and insert -- Duplex --, therefor.

In Column 5, Line 38, delete "LE" and insert -- UE --, therefor.

In Column 6, Line 54, delete "LE" and insert -- UE --, therefor.

In Column 6, Line 58, delete "LE" and insert -- UE --, therefor.

In Column 7, Line 11, delete "received;" and insert -- received. --, therefor.

In Column 7, Line 27, delete "LE" and insert -- UE --, therefor.

Signed and Sealed this  
Twentieth Day of September, 2011

David J. Kappos  
*Director of the United States Patent and Trademark Office*